United States Patent [19]

Lee

[11] Patent Number: 5,788,594
[45] Date of Patent: Aug. 4, 1998

[54] LOW NOISE BELT FOR CONTINUOUSLY VARIABLE TRANSMISSION

[75] Inventor: Chung Seob Lee, Kyungki-do, Rep. of Korea

[73] Assignee: Hyundai Motor Company, Seoul, Rep. of Korea

[21] Appl. No.: 773,776

[22] Filed: Dec. 26, 1996

[30] Foreign Application Priority Data

Dec. 27, 1995 [KR] Rep. of Korea ............... 95-58570

[51] Int. Cl.[6] .................................................. F16G 5/16
[52] U.S. Cl. ................................................... 474/244
[58] Field of Search ............................. 474/242, 243, 474/244, 245

[56] References Cited

U.S. PATENT DOCUMENTS 4,457,742  7/1984  Hattori et al. .................. 474/242 X
4,494,946  1/1985  Wilcox ............................. 474/242
4,755,163  7/1988  Kanehira et al. ................. 474/242

*Primary Examiner*—Roger J. Schoeppel
*Attorney, Agent, or Firm*—Birch, Stewart, Kolasch & Birch, LLP

[57] ABSTRACT

A low noise belt for a continuously variable transmission includes a plurality of stacked strip members and a plurality of blocks each having head and body parts and a middle portion where the head and body parts are divided. The middle portion is provided with notches into which the stacked strip members are inserted, wherein each block is bent at its middle portion at a fixed angle in order to improve torque transmission efficiency and minimize the generation of noise and increasing the contact surface with pulleys.

4 Claims, 4 Drawing Sheets 5,788,594

1

LOW NOISE BELT FOR CONTINUOUSLY VARIABLE TRANSMISSION

BACKGROUND

The present invention relates to a low noise belt for a continuously variable transmission. More particularly, the present invention relates to a low noise belt for a continuously variable transmission which increases torque transmission efficiency by increasing a frictional contact surface with pulleys, and minimizes the generation of noise by means of bending a middle portion of the blocks at a fixed angle.

In general, a continuously variable transmission is an automatic transmission which has two pulleys attached respectively to input and output shafts. Each pulley has opposite side plates, a distance between which is variable. The pulleys are connected to each other by steel belts or chains so that a transmission can be continuously varied, realizing the advantages of increased power and fuel efficiency and a reduction in weight.

Hereinafter, a conventional continuously variable transmission is explained with reference to the accompanying drawings.

As shown in FIG. 5, FIG. 6A and FIG. 6B, a conventional continuously variable transmission includes a plurality of blocks 100 which are stacked next to each other, and steel bands 102 and 104 which support the blocks 100 on both sides.

The blocks 100 in the above include notches 106 and 108 which are formed at a middle portion of the block 100, a head 110 which is located above the notches and formed in a triangle shape, a body 112 having sides which are slanted downward so that the part below the notches 106 and 108 are further narrowed, a lug 114 projected out one side of the head 110 of the block 100, and a groove 116 to allow insertion of a lug 114 and formed on a side opposite that of the lug 114.

The blocks 100 formed as in the above are integrated in a back-to-back fashion so that the lugs 114 are inserted into the grooves 116, the number of blocks used being unlimited and stacked depending on the length of the steel bands 102 and 104. In this way, a steel belt is made by inserting the steel bands 102 and 104 into the notches 106 and 108 of the blocks 100.

However, in the conventional prior art steel belt, the blocks are realized by processing plane members. Even if opposite sides of the blocks contact with pulleys, the contact surface is not wide. Accordingly, the conventional steel belt has a disadvantage wherein there is low power transmission efficiency and a high generation of noise.

SUMMARY

Accordingly, the object of the present invention is to provide a low noise belt for a continuously variable transmission which increases torque transmission efficiency by increasing surfaces of frictional contact with pulleys, and minimizes the generation of noise by means of bending head and body parts at a middle portion and at a fixed angle.

It is another object of the present invention to increase a velocity ratio of the continuously variable transmission by increasing a variation rate of a radius of rotation.

The present invention includes a plurality of stacked strip members and a plurality of blocks. The blocks are divided into two parts of head and body by its middle portion. Also, notches are formed on the middle portion of the blocks to

2 allow for the insertion of the stacked strip members. Each of the blocks is bent at its middle portion at a fixed angle.

Accordingly, the present invention provides a low noise belt for a continuously variable transmission having layered steel bands inserted into the notches of the blocks.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

Further objects and other advantages of the present invention will become apparent from the following description in conjunction with the attached drawings, in which.

DESCRIPTION

Reference will now be made in detail to a preferred embodiment of the present invention, an example of which is illustrated in the accompanying drawings.

Figure 1:
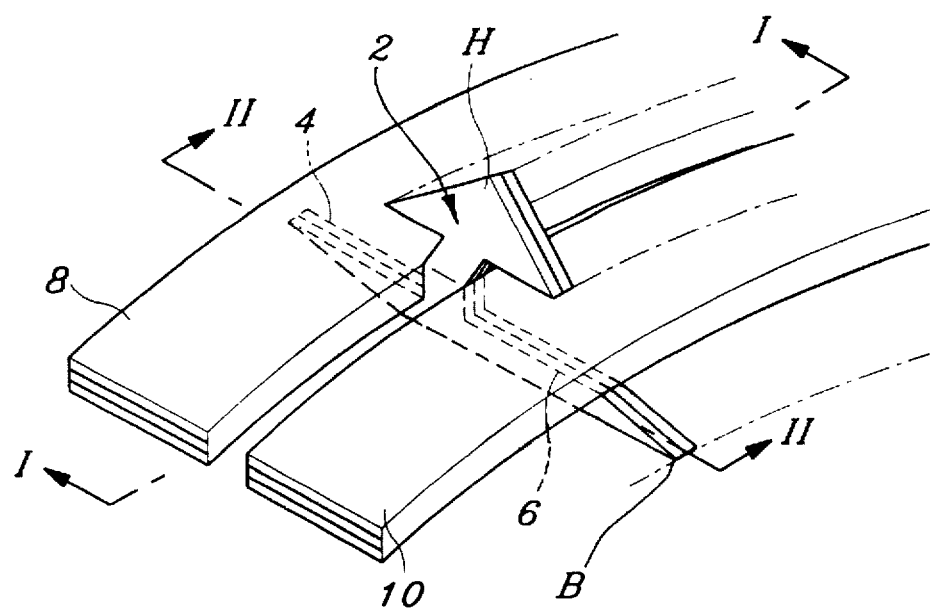
FIG. 1 shows a partial perspective view of a low noise belt for a continuously variable transmission according to a preferred embodiment of the present invention.
Figure 4:
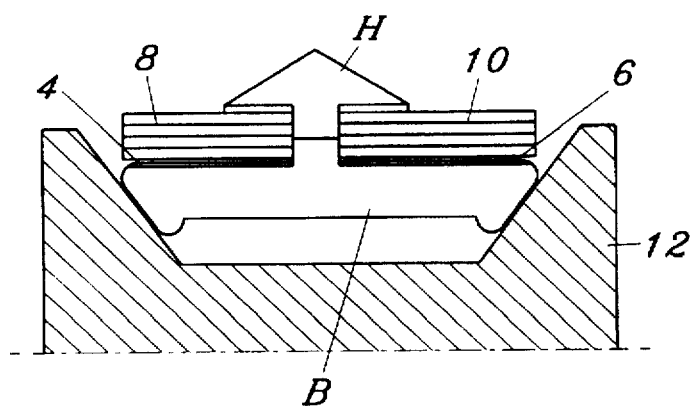
FIG. 4 shows a sectional view taken along line II—II line of FIG. 1.
Figure 2:
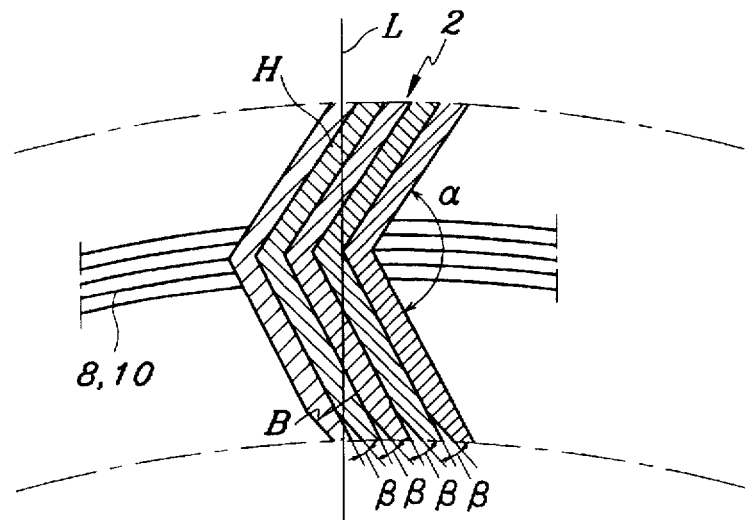
FIG. 2 shows a sectional view taken along line I—I of FIG. 1.

FIG. 1 and FIG. 2 respectively show a partial perspective view of the present invention and a sectional view according to a preferred embodiment of the present invention. Reference number 2 in the drawings indicates a block.

A head H of the blocks 2 is small-sized compared with a body B of the blocks 2, and the blocks 2 are bent at an angle α a at a middle portion thereof.

Notches 4 and 6 are formed at a middle of the blocks 2 so that steel bands 8 and 10 can be inserted therein. The blocks 2 are stacked next to each other in a back-to-back fashion.

In order to improve durability and give flexibility to the belt, the steel bands 8 and 10 inserted into the notches 4 and 6 consist of strip members and are multi-layered.

Figure 3:
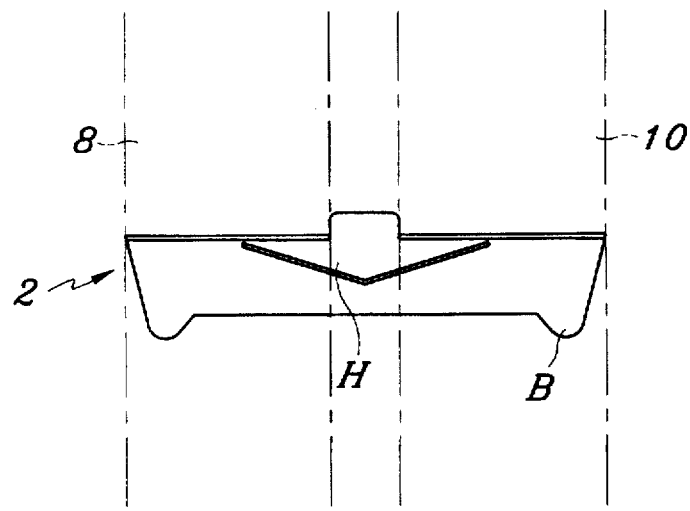
FIG. 3 shows a plane view of blocks multi-layered in accordance with the present invention.
Figure 5:
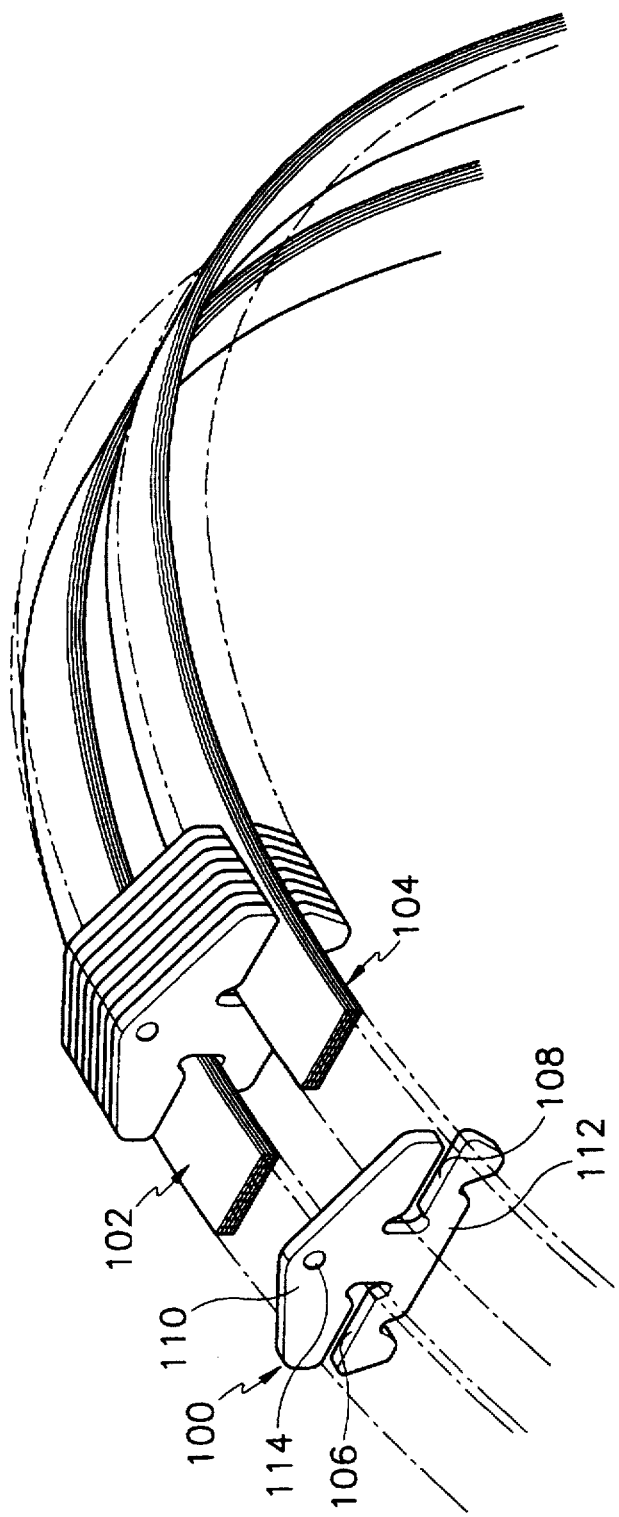
FIG. 5 shows a partial perspective view of a conventional belt.
Figure 6A:
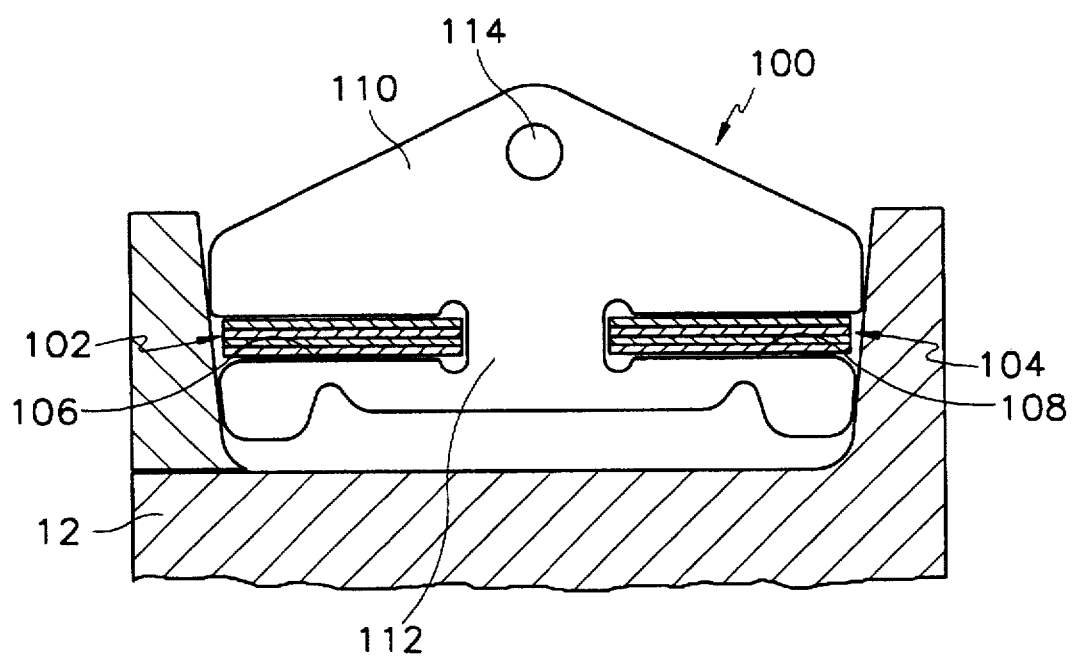
FIG. 6A shows a front view of a low noise belt for a continuously variable transmission as shown in FIG. 5.
Figure 6B:
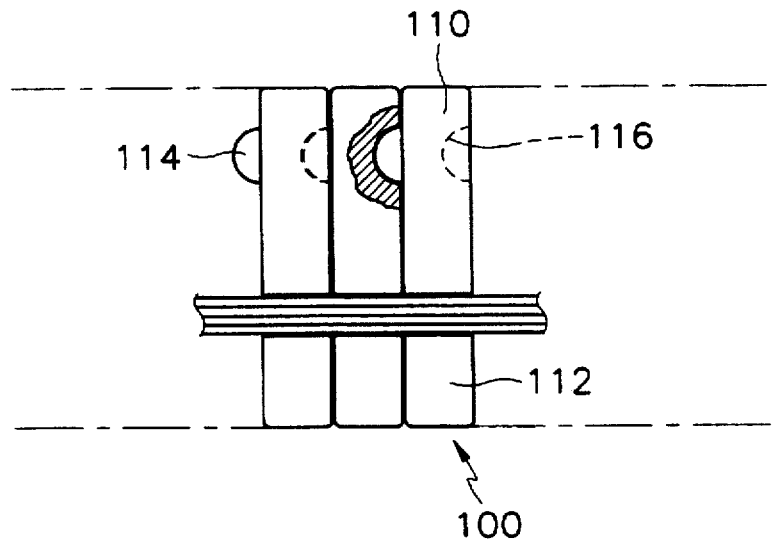
FIG. 6B shows a side view of a low noise belt for a continuously variable transmission as shown in FIG. 5.

As shown in FIG. 3, the blocks 2, which are individually manufactured, are integrated so that steel bands 8 and 10 on the bands are inserted into the notches 4 and 6. The number of blocks used depends on the size of the steel bands 8 and 10 and are not limited in the number. Since one face of the block 2 is bent at a fixed angle, there is no need to form lugs and grooves such as in the prior art.

Accordingly, the block 2 can be easily manufactured by using the above-mentioned method.

Also, pulleys 12 make contact with two or more blocks 2 and this results in an increase in contact power and a reduction in the generation of noise. Namely, on the assumption that line L is a straight line touching one side of the body B of the blocks as shown in FIG. 2, the number of blocks touching line L is at least two. In contrast with the conventional belt, the present invention improves not only the amount of contact made between the pulleys 12 and blocks 2 but also reduces the generation of noise since contact is continuously realized.

In order to accomplish the above, one face of the blocks 2 is bent at an angle a at its middle portion, and a lower portion of the other face in chamfered so that an angle β is formed when drawing an imaginary extension line from the side on which the section is chamfered.

Since a middle portion from head to body part in the blocks is bent at a fixed angle, the contact surface with the pulleys 12 is enlarged, and increasing the amount of contact power. Thereby, torque transmission efficiency improves while the generation of noise is minimized.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claim is:

1. A low noise belt for a continuously variable transmission, comprising:

a plurality of stacked strip members; and a plurality of blocks each having head and body parts and a middle portion by which the head and body parts are divided, the middle portion being provided with notches into which the stacked strip members are inserted, wherein each said block is bent at its middle portion at a fixed angle, each middle portion of each block substantially contacts a middle portion of a neighboring block, whereby noise generated by said belt is substantially reduced while frictional contact surface area and torque transmission efficiency of said belt are substantially increased.

2. The low noise belt for a continuously variable transmission according to claim 1, wherein a lower portion of one face in the body part is chamfered.

3. The low noise belt for a continuously variable transmission according to claim 1, wherein the fixed angle is within the range from 90° to 150°.

4. The low noise belt for a continuously variable transmission according to claim 1, wherein in a location where the belt and pulley start to contact with each other and a location where contact of the belt and pulley finish, more than two blocks of the belt make contact with the pulley.

* * * * *